United States Patent [19]
Hensler

[11] Patent Number: 4,978,243
[45] Date of Patent: Dec. 18, 1990

[54] AUTOMATIC BOOM REST AND LATCH

[75] Inventor: David L. Hensler, Fort Wayne, Ind.
[73] Assignee: Hydra Tech, Inc., Fort Wayne, Ind.

[21] Appl. No.: 460,352
[22] Filed: Jan. 3, 1990
[51] Int. Cl.[5] .............................................. F16D 1/00
[52] U.S. Cl. ...................................... 403/24; 403/328; 182/2
[58] Field of Search .................... 182/2; 212/229, 267, 212/268; 403/24, 322, 328, 15; 414/694

[56] References Cited

U.S. PATENT DOCUMENTS 2,489,864 11/1949 Cravener .......................... 403/15 X

FOREIGN PATENT DOCUMENTS 981201 12/1982 U.S.S.R. ................................. 182/2

*Primary Examiner*—Andrew V. Kundraf
*Attorney, Agent, or Firm*—Baker & Daniels

[57] ABSTRACT

Boom latch system for a boom movable between use and stowage positions. The boom latch includes a latch member that is operatively connected to the power supply which moves the boom, so that that the boom is automatically latched when moved to its stowage position, and automatically unlatched when moved from its stowage position.

27 Claims, 3 Drawing Sheets

AUTOMATIC BOOM REST AND LATCH

FIELD OF THE INVENTION

This invention relates to vehicles and other equipment having booms, and in particular to devices for securing such booms to prevent movement thereof during transport.

BACKGROUND OF THE INVENTION

Vehicles such as cherry pickers, cranes, backhoes and the like usually include a one or two piece boom. Before these vehicles are driven or transported, the boom is usually moved to a stowage position to prevent undue stress on the boom. However, the boom still has a tendency to bounce when the vehicle hits a bump or encounters a turn during transport. This causes significant stress on the joints where the boom is connected to the vehicle and on those portions of the boom which strike other parts of the vehicles. Therefore, it is necessary to secure the boom prior to transport of the vehicle.

Securement of the boom is usually accomplished by providing a boom rest which supports the boom when the boom is moved to its stowage position. Tie-down straps may then be manually wrapped from one side of the rest, around the boom, to the opposite side of the rest and securely tightened. This minimizes both vertical and lateral movement of the boom during transport. However, the boom rest is frequently located in a location which is difficult to reach, such as on top of the cab of the vehicle. Moreover, operators often forget to use such manual systems, which leads to an unnecessarily frequent number of instances in which the boom bounces out of the rest during transport and damages the boom or the vehicle. To eliminate this potential for operator error, it is desirable to provide a system for automatically latching a boom without additional action by the operator.

Several devices are known for automatically latching a boom. U.S. Pat. Nos. 2,423,583 and 2,699,314 discloses devices for automatically securing a boom mast on a cargo ship. However, these devices do not automatically align the boom with the latch and thus require additional operator intervention to provide such alignment. In addition, these devices require that the boom be manually unlatched before the boom can be moved to a use position.

U.S. Pat. Nos. 4,184,803, 4,273,502, 4,278,394 and 4,370,090 disclose a series of backhoe boom latches in which a ring is attached to the boom. The bottom of the boom is connected to the frame of the vehicle, and the boom pivots about a horizontal axis by a vertical pivot pin. When the boom is moved towards its stowage position, the ring slides over the top of the pivot pin until it surrounds the pin, and the ring then drops over the pivot pin. To release the boom, the ring may be manually lifted above the pin. However, movement of the boom towards a use position (whether by actuation of hydraulic controls or by bouncing of the vehicle during transport) may also cause the ring to be lifted from the pin. U.S. Pat. No. 4,636,132 discloses a variation on this concept. Instead of a ring dropping around a pin on the frame, a latch drops behind a slot in the pin when the boom is moved to its stowage position. Again, the latch must be manually released. These devices have several shortcomings. Most notably, none are positive latches, in that bouncing of the boom during transport can generate enough movement of the boom to unlatch it. Also, these latches only prevent horizontal movement of the boom, and not vertical movement. Additionally, these devices do not support the weight of the boom, which is an important factor in achieving boom stability during transport.

U.S. Pat. No. 4,674,638 discloses a system for dampening boom oscillation during transport by supplying hydraulic pressure to the boom's hydraulic cylinders. However, this system does not latch the boom.

OBJECTS OF THE INVENTION

One object of the invention is to provide a boom latch that will automatically secure a boom upon movement of the boom to its stowage position.

Another object of the invention is to provide a boom latch which automatically unlatches a boom upon application of power to move the boom.

Another object of the invention is to provide a boom latch which bears the weight of the boom.

Another object of the invention is to provide a boom latch that will automatically align the boom toward its proper stowage position.

Another object of the invention is to provide a boom latch that is integrated with the boom actuating controls.

Another object of the invention is to provide a boom latch that may be manually unlatched.

Another object of the invention is to provide a boom latch which may be easily retrofitted to existing vehicles and equipment.

Another object of the invention is to provide a boom latch which is inexpensive and easily constructed.

Still other objects and advantages of the invention will become apparent to those of skill in the art after reading the following description of the invention.

SUMMARY OF THE INVENTION

The invention comprises a boom latch system for a boom movable between use and stowage positions. The boom latch includes a latch member movable between latched and unlatched positions. When in the latched position, the latch member engages a latch member receiving means connected to the boom. The latch member is operatively connected to the power supply means which moves the boom, so that that the boom may be automatically latched when moved to its stowage position, and automatically unlatched when power is applied to move the boom to a use position.

DETAILED DESCRIPTION OF THE PRESENT INVENTION

Figure 1:
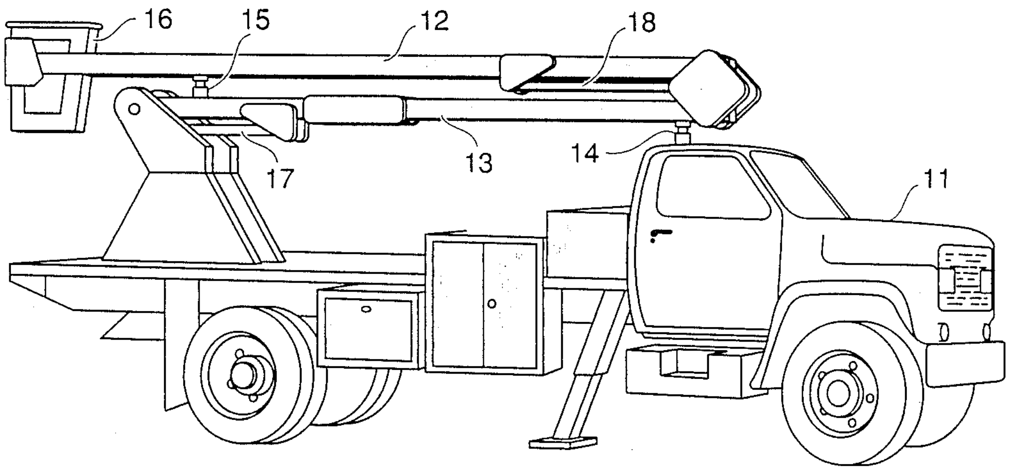
FIG. 1 is a perspective view showing a representative vehicle with which a boom latch of the present invention may be used.

FIG. 1 shows a representative vehicle 11 to which an automatic boom latch of the present invention may applied. Although a cherry picker is shown, it will be appreciated that the latch may be applied to any other vehicle having a movable boom, such as a crane or backhoe. Vehicle 11 has both an upper boom 12 and lower boom 13. In FIG. 1, both booms are in their stowage positions so the vehicle is ready for transport. A first boom latch 14 may mounted to the front of the vehicle to latch lower boom 13, and a second boom latch 15 may be mounted on lower boom 13 to latch upper boom 12. It will be appreciated that each boom latch 14 and 15 at least partially supports the weight of the boom. Although vehicle 11 includes two boom latches, a single latch, or more than two latches, may be desirable depending on the particular vehicle and its uses. Booms 12 and 13 are generally moved by hydraulic cylinders 17 and 18, which are actuated by hydraulic controls (not shown) by an operator in bucket 16.

Figure 2:
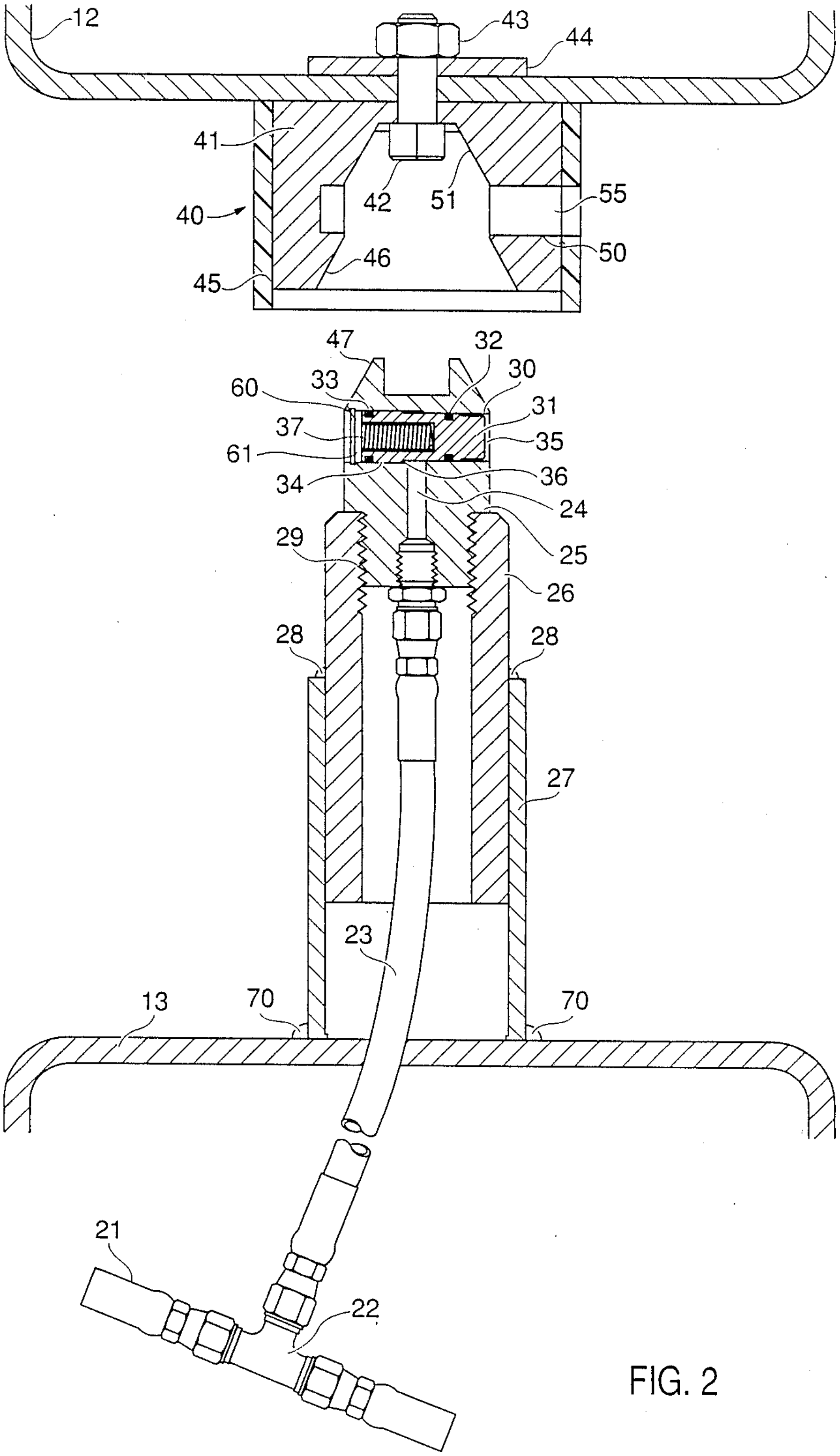
FIG. 2 is a partial section showing a boom latch of the present invention in an unlatched condition.
Figure 3:
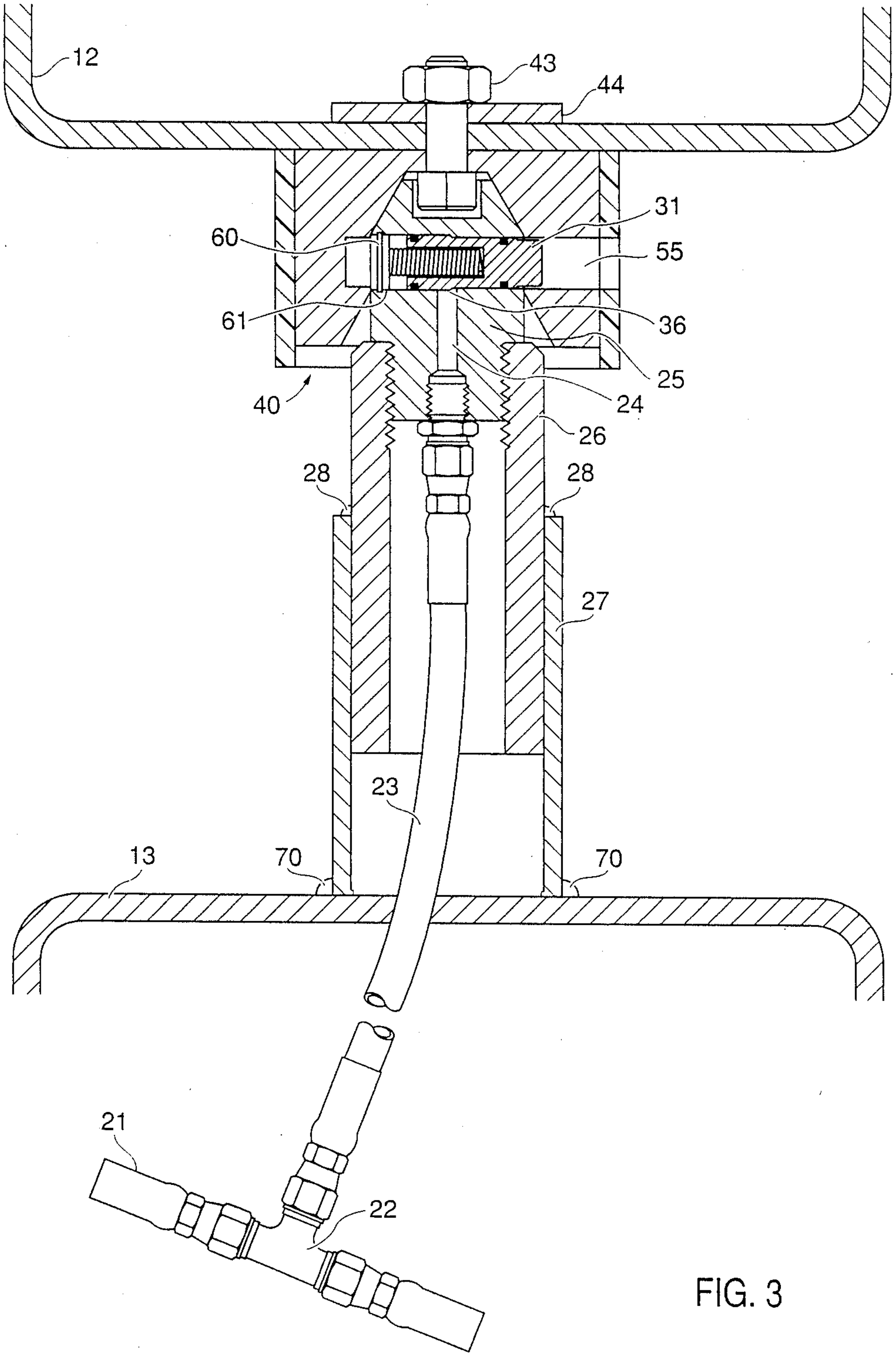
FIG. 3 is a partial section showing a boom latch of the present invention in a latched condition.

FIG. 2 is a partial section showing a boom latch of the present invention in an unlatched condition. The boom latch shown is located on a lower boom and latches an upper boom, as shown as 15 in FIG. 1. Upper boom 12 is raised from lower boom 13, and is therefore in a use position. A power supply means, hydraulic hose 21, passes through lower boom 13, and supplies hydraulic power to cylinder 18. It will be appreciated that when such power is applied to raise upper boom 12, a high hydraulic pressure will exist in hose 21. When upper boom is moved to its stowage position as shown in FIGS. 1 and 3, hydraulic pressure in hose 21 will drop. Through T connector 22, hydraulic pressure is operatively communicated through hose 23 to hydraulic chamber 24 of stainless steel cylindrical latch body 25. Latch body 25 is distanced from lower boom 13 by steel inner nose tube 26, which is welded at 28 to steel outer nose tube 27, which is welded at 70 to lower boom 13. The upper interior portion of inner nose tube 26 is threaded at 29 to receive latch body 25. Hose 23 is also sealingly screwed into latch body 25.

Latch body 25 is defined by its exterior surface. Latch body 25 contains a central bore 30 in which latch member 31 may move laterally. In FIG. 2, latch member 31 is shown in its unlatched position in which it resides within latch body 25, while in FIG. 3, it is in a latched position whereby it projects from latch body 25. Spring 37 is mounted in bore 30 by retaining ring 60 and washer 61 to bias latch member 31 toward its projecting, latched position, as shown in FIG. 3. Disposed around latch member 31 are O rings 32 and 33, which help seal hydraulic chamber 24.

An important feature of latch member 31 is that its diameter varies so that it is wider at end 34 than at end 35. Annular ridge 36 defines the point where the diameter of latch member 31 changes. The diameter of bore 30 also varies accordingly, and thereby prevents latch member 31 from exiting bore 30.

When it is desired that upper boom 12 be raised from its stowage position, increased hydraulic pressure is applied to hose 21. This increase in pressure will be communicated through hose 23 to hydraulic chamber 24, and the pressure will act on annular ridge 36 to bias and move latch member 31, against the force of spring 37, from its projecting, latched position shown in FIG. 3, to the non-projecting, unlatched position shown in FIG. 2. It will be appreciated that the movement of latch member 31 will cause the volume of hydraulic chamber 24 to increase. It will also be appreciated that an operator need not take any additional action to unlatch upper boom 12; it is automatically unlatched as the hydraulic controls are operated to raise upper boom 12.

In FIG. 2, upper boom 12 is in a raised, use position. Mounted on the lower portion of boom 12 is cylindrical latch receiving means 40. Latch receiving means includes case hardened steel housing cup 41, which is secured to upper boom 12 by socket bolt 42, nut 43 and washer 44. Cup 41 snugly fits in PVC pipe 45. It will also be appreciated that the interior surface 46 of cup 41 is inwardly tapered toward its upper end, and the upper outer surface 47 of latch body 25 is correspondingly tapered. Thus, when upper boom is lowered toward its stowage position as shown in FIG. 3, tapered interior surface 46 and tapered outer surface 47 will act to properly align upper boom 12 over lower boom 13.

When upper boom 12 is fully lowered as shown in FIG. 3, hydraulic pressure in hose 21 and hydraulic chamber 24 will drop to or near zero. This will cause spring 37 to force latch member 31 outward until it projects from latch body 25 to engage the latch member receiving means of cup 41, namely, lip 50. In this position, both lateral and vertical movement of upper boom 12 with respect to lower boom 13 will be restricted, and no additional operator action, other than the lowering of upper boom 12, has been required. Moreover, it will be appreciated that the upper surface 47 of latch body 25 will engage the inner surface 51 of cup 40, and thereby allow lower boom 13 to support the weight of upper boom 12 to proved a more secure latched condition.

As described above, when hydraulic pressure is applied to raise upper boom 12, latch member 31 will be moved to the unlatched position shown in FIG. 2. However, in the unlikely event latch member 31 does not move, due, for example, to blockage in hydraulic hose 23, upper boom 12 may be manually unlatched. Cup 41 and PVC pipe 45 include a bore 55 at the location adapted to receive latch member 31. A suitable object, such as a screwdriver, may be inserted through bore 55 to manually push latch member 31 against the force of spring 37 until upper boom 12 is unlatched from lower boom 13.

It will be appreciated by those of skill in the art that the present invention provides an inexpensive, easily installable and retrofitable boom latch. However, numerous obvious changes could be made to the above implementation without departing from the spirit of the invention. For example, the hydraulic latch member could easily be replaced with a different actuating mechanism such as a solenoid. Such a solenoid could be positioned within the latch body, and connected to a hydraulic sensor or boom location sensing switch to automatically extend or retract the latch member upon taking action to move the boom to or from its latched position. The hydraulic power supply means could also be replaced, for example, by an electrical power supply means. Other well known mechanisms could also be employed, the primary concept being that no additional operator intervention is required to latch (or unlatch) the boom.

It is also within the scope of the invention to switch the two latching mechanisms shown in the drawings. For example, the nose assembly including the latch member could be placed on upper boom 12, and cup 41 on lower boom 13. In addition, many variations in the type of latch mechanism could be employed in substitution of the reciprocating latch member shown in the drawings. For example, a J hook could downwardly extend from the upper boom into a housing on the lower boom, and be latched by a latch member movable to traverse the hook. Also, cup 41 could be dispensed with entirely, and replaced with a hole in upper boom which would fit over the upper portion of latch body 25.

It is also within the scope of the invention to provide a latch mechanism that is actuated by a decrease in hydraulic pressure from, for example, a reservoir of hydraulic fluid used to actuate a boom. Moreover, the latch of the present invention may be easily retrofitted to existing vehicles. In such cases, due to varying tolerances between vehicles, the final step in such retrofitting may be to weld together inner nose tube 26 and outer nose tube 27 after determining the required height of latch body 25.

Many other changes could be made in the above construction and many apparently widely different embodiments of this invention could be made without departing from the scope thereof, and it is intended that all matter contained in the above description or shown in the accompanying drawings shall be interpreted as illustrative and not in a limiting sense.

I claim:

1. A boom latch system comprising:
a boom movable between a use position and a stowage position,
a power supply means for moving said boom,
a latch member receiving means,
a boom latch comprising
a latch body,
a latch member movable between an unlatched position and a latched position in which it is engagable with the latch member receiving means,
the latch member being operably connected to the power supply means to move the latch member between the unlatched and latched positions such that the boom may be latched in the stowage position.

2. The boom latch system of claim 1, wherein the latch member projects further from the latch body when in its latched position, than when in its unlatched position.

3. The boom latch system of claim 1 wherein the power supply means is hydraulic.

4. The boom latch system of claim 3 wherein the latch body includes a hydraulic chamber, and wherein the chamber has a greater volume when the latch member is in the unlatched position.

5. The boom latch system of claim 4 wherein the diameter of the latch member varies such that the latch member is moved toward the unlatched position upon an increase in hydraulic pressure in the hydraulic chamber.

6. The boom latch system of claim 1 wherein a portion of the latch body is tapered.

7. The boom latch system of claim 1 wherein the latch body includes means for supporting the weight of the boom.

8. The boom latch system of claim 1 wherein the latch member receiving means includes manual unlatch means.

9. The boom latch system of claim 1 further comprising solenoid means for moving the latch member.

10. The boom latch system of claim 1, further comprising bias means for biasing the latch member against the direction of movement of the latch member upon an increase of power in the power supply means.

11. The boom latch system of claim 1 wherein the boom latch receiving means comprises a housing adapted to receive a portion of the latch body and the latch member, the housing having a lip adapted to engage the latch member to thereby latch the boom to the latch body.

12. A boom latch system comprising:
hydraulic pressure supply means for moving a boom,
a boom latch comprising a latch member adapted for movement between latched and unlatched positions, the latch member being in operative communication with the hydraulic pressure supply means to move the latch member upon a change in hydraulic pressure in the hydraulic pressure supply means.

13. The boom latch system of claim 12, further comprising bias means for biasing the latch member toward the latched position.

14. The boom latch system of claim 12, wherein the latch member projects further from the latch body when in its latched position than when in its unlatched position.

15. The boom latch system of claim 14 wherein the latch body includes a hydraulic chamber, and wherein the chamber has a greater volume when the latch member is in the unlatched position.

16. The boom latch system of claim 15 wherein the diameter of the latch member varies such that the latch member is moved toward the unlatched position upon an increase in hydraulic pressure in the hydraulic chamber.

17. The boom latch system of claim 12 wherein a portion of the latch body is tapered.

18. The boom latch system of claim 12 wherein the latch body includes means for supporting the weight of the boom.

19. The boom latch system of claim 12, further comprising bias means for biasing the latch member against the direction of movement of the latch member upon an increase in hydraulic pressure.

20. A boom latch system comprising:
a boom movable between a use position and a stowage position,
a latch member receiving means,
hydraulic pressure supply means for moving said boom,
a boom latch comprising
a latch body,
a latch member movable between an unlatched position, and a latched position in which the latch member projects from the latch body further than when in the unlatched position,
the latch member being operably connected to the hydraulic power supply means to move the latch member toward the unlatched position upon an increase in hydraulic pressure in the hydraulic pressure supply means, and
bias means for biasing the latch member against the direction of movement of the latch member upon an increase in hydraulic pressure.

21. The boom latch system of claim 20 wherein the latch body includes a hydraulic chamber, and wherein the chamber has a greater volume when the latch member is in the unlatched position.

22. The boom latch system of claim 21 wherein the diameter of the latch member varies such that the latch member is moved toward the unlatched position upon an increase in hydraulic pressure in the hydraulic chamber.

23. The boom latch system of claim 20 wherein a portion of the latch body is tapered.

24. The boom latch system of claim 20 wherein the latch body includes means for supporting the weight of the boom.

25. The boom latch system of claim 20 wherein the latch member receiving means includes manual unlatch means.

26. The boom latch system of claim 20 wherein the boom latch receiving means comprises a housing adapted to receive a portion of the latch body and the latch member, the housing having a lip adapted to engage the latch member to thereby latch the boom to the latch body.

27. The boom latch system of claim 20 wherein the latch member receiving means is connected to the boom.

* * * * *